(12) United States Patent
Gurajapu et al.

(10) Patent No.: US 11,244,164 B2
(45) Date of Patent: Feb. 8, 2022

(54) AUGMENTATION OF UNMANNED-VEHICLE LINE-OF-SIGHT

(71) Applicant: Honeywell International Inc., Morris Plains, NJ (US)

(72) Inventors: Prasanna Murthy Gurajapu, Bengaluru (IN); Bimalananda Behera, Bengaluru (IN); Venkata Pavan M, Bengaluru (IN); Shreyas Joshi, Bengaluru (IN); Arjun Bindu Jyothikumar, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/780,282

(22) Filed: Feb. 3, 2020

(65) Prior Publication Data

US 2021/0240986 A1 Aug. 5, 2021

(51) Int. Cl.
| | |
|---|---|
| *G06K 9/00* | (2006.01) |
| *G05D 1/00* | (2006.01) |
| *G06T 11/60* | (2006.01) |
| *G08G 5/00* | (2006.01) |

(52) U.S. Cl.
CPC ....... *G06K 9/00671* (2013.01); *G05D 1/0044* (2013.01); *G06T 11/60* (2013.01); *G08G 5/006* (2013.01); *G08G 5/0069* (2013.01); *G05D 1/0022* (2013.01); *G05D 1/0094* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 7,920,071 B2 | 4/2011 | Baillot | |
| 8,397,181 B2 | 3/2013 | Hartman et al. | |
| 9,563,201 B1 * | 2/2017 | Tofte | H04N 5/247 |
| 10,809,081 B1 * | 10/2020 | Kentley-Klay | G06T 19/006 |
| 2007/0273557 A1 | 11/2007 | Baillot | |
| 2012/0093357 A1 * | 4/2012 | Seder | B60W 30/095 |
| | | | 382/103 |
| 2013/0010103 A1 * | 1/2013 | Ihara | G06Q 30/06 |
| | | | 348/116 |
| 2013/0267838 A1 * | 10/2013 | Frank | A61B 5/7425 |
| | | | 600/424 |
| 2014/0180972 A1 * | 6/2014 | Boldyrev | G06N 5/02 |
| | | | 706/12 |
| 2015/0339453 A1 * | 11/2015 | Richards | G06T 19/006 |
| | | | 345/633 |

(Continued)

OTHER PUBLICATIONS

Federal Aviation Administration, "B4UFLY Mobile App", Dec. 20, 2018, URL: https://web.archive.org/web/20181220140425/https://www.faa.gov/uas/recreational_fliers/where_can_i_fly/b4ufly/ (Year: 2018).*

(Continued)

*Primary Examiner* — David H Chu
(74) *Attorney, Agent, or Firm* — Shumaker & Sieffert, P.A.

(57) ABSTRACT

An augmented-reality head-mounted display is configured to display an indication of a location of an unmanned aerial vehicle with respect to the field-of-view of the head-mounted display, in order to assist a UAV operator to maintain line-of-sight with the UAV.

17 Claims, 12 Drawing Sheets

(56) References Cited

U.S. PATENT DOCUMENTS

| | | | | |
|---|---|---|---|---|
| 2016/0055676 | A1* | 2/2016 | Kasahara | G06T 19/006 345/633 |
| 2016/0246384 | A1* | 8/2016 | Mullins | G06F 3/011 |
| 2016/0371884 | A1* | 12/2016 | Benko | G02B 27/017 |
| 2018/0005446 | A1* | 1/2018 | Elazary | G06T 7/20 |
| 2018/0164801 | A1* | 6/2018 | Kim | H04M 1/72415 |
| 2018/0249343 | A1* | 8/2018 | Priest | B64D 47/08 |
| 2020/0244943 | A1* | 7/2020 | Morand | G06T 11/00 |
| 2020/0402219 | A1* | 12/2020 | Gilbert | G06T 7/001 |

OTHER PUBLICATIONS

Jourdan Aldredge, "Vermeer Beta: Use Augmented Reality to Control Your Aerial Drones for Video", Nov. 19, 2018, URL: https://nofilmschool.com/Vermeer-AR-Drone-Technology (Year: 2018).*

"Drone Detection and stabilization platform," RBD Lab, Haifa University Robotics & Big Data Lab, accessed from https://venturebeat.com/2018/08/28/epson-lets-you-pilot-drones-with-its-moverio-augmented-reality-glasses/, Jan. 8, 2018, 6 pp.

Rees, "Epson Launches New Augmented Reality App for DJI Drone Pilots," Unmanned Systems Technology, accessed from https://www.unmannedsystemstechnology.com/2018/08/epson-launches-new-augmented-reality-app-for-dji-drone-pilots/, Aug. 29, 2018, 10 pp.

Bhutani et al., "Commerical Drone / UAV Market worth over $17bn by 2024," Global Market Insights, Industry Reports, accessed from https://www.gminsights.com/pressrelease/unmanned-aerial-vehicles-UAV-commercial-drone-market, Feb. 26, 2018, 5 pp.

Takahasi, "Epson lets you pilot droves with its Moverio augmented reality glasses," venturebeat.com, accessed from https://venturebeat.com/2018/08/28/epson-lets-you-pilot-drones-with-its-moverio-augmented-reality-glasses/, Aug. 28, 2018, 8 pp.

Extended Search Report from counterpart European Application No. 21151709.9, dated Jun. 21, 2021, 9 pp.

Response to the Extended Search Report dated Jun. 21, 2021, from counterpart European Application No. 21151709.9, filed Sep. 10, 2021, 15 pp.

* cited by examiner

AUGMENTATION OF UNMANNED-VEHICLE LINE-OF-SIGHT

TECHNICAL FIELD

This disclosure relates to unmanned aerial vehicles (UAVs).

BACKGROUND

Large-scale industrial companies, especially in utilities, oil, and gas, may own hundreds of miles of asset (e.g., powerline, pipeline) infrastructure that needs to be inspected periodically to ensure high productivity. Recently, some entities have begun utilizing small unmanned aerial vehicles (UAVs) to perform these periodic inspections due to the UAVs' ability to quickly collect high-quality data. Federal Aviation Administration (FAA) regulations require that a UAV operator or pilot maintain a line-of-sight (LOS) with the UAV at all times.

SUMMARY

In general, this disclosure relates to systems and techniques for determining and indicating a position of at least one unmanned aerial vehicle (UAV) with respect to the UAV's pilot, in order to assist the pilot to maintain line-of-sight (LOS) with the UAV. As described herein, an augmented-reality (AR) head-mounted display (HMD), worn by the UAV pilot, is configured to display an indication of the location of a UAV with respect to the HMD's field-of-view (FOV).

In one example, this disclosure describes a device comprising an AR HMD and processing circuitry configured to determine a location of a UAV; determine an orientation of the AR HMD; and present, on the AR HMD, an indication of the location of the UAV based on the orientation of the AR HMD.

In another example, this disclosure describes a method comprising determining a location of a UAV; determining an orientation of the AR HMD; and presenting, on the AR HMD, an indication of the location of the UAV based on the orientation of the AR HMD.

The details of one or more examples of the disclosure are set forth in the accompanying drawings and the description below. Other features, objects, and advantages will be apparent from the description, drawings, and claims.

DETAILED DESCRIPTION

Figure 1:
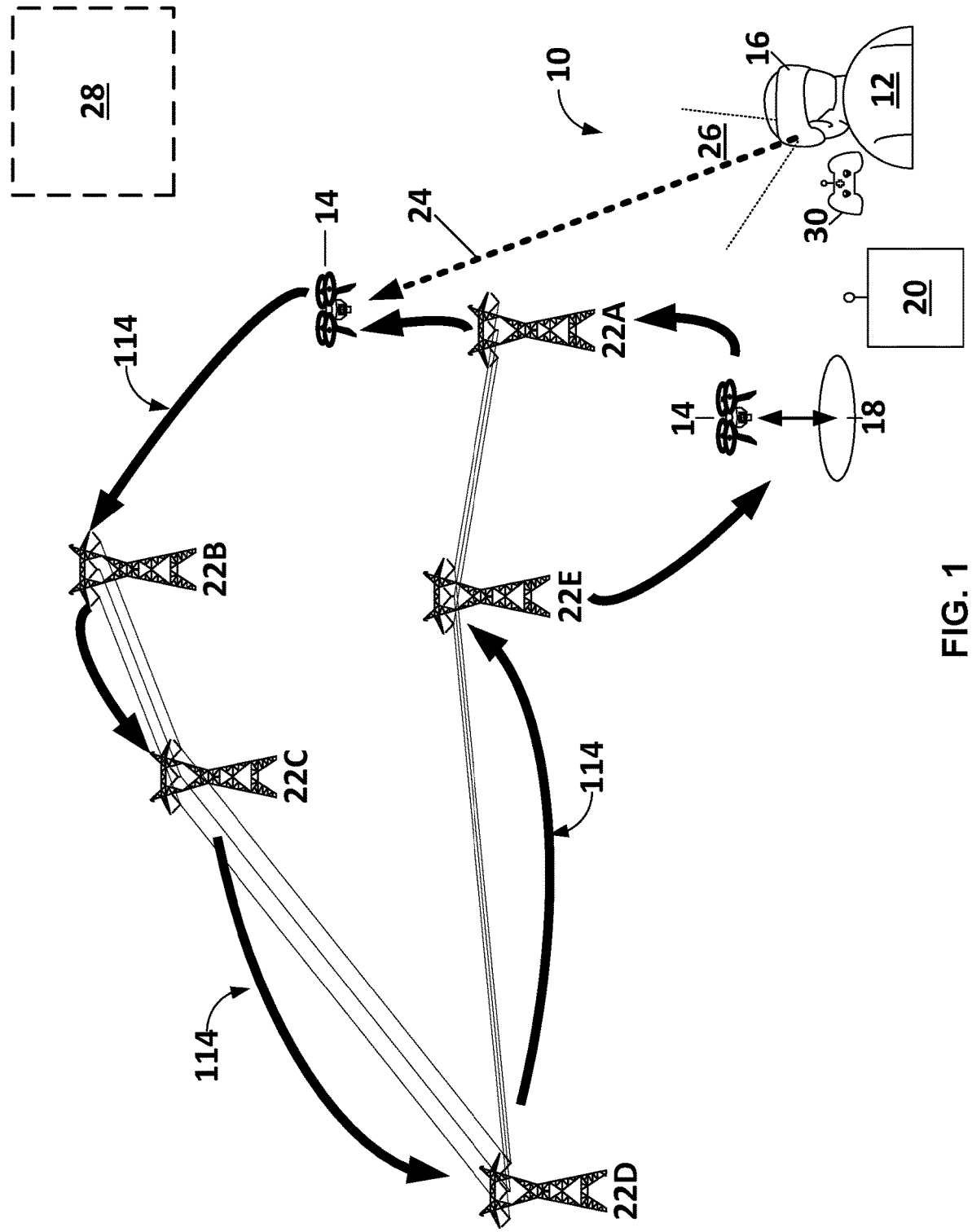
FIG. 1 is a conceptual diagram depicting the inspection of a utility asset with an unmanned aerial vehicle (UAV), which may be conducted according to one or more techniques of this disclosure.

The use of Unmanned Aerial Vehicles (UAVs) is becoming increasingly common in non-military operations, including, but not limited to, surveillance, search and rescue, shipping and delivery, and inspections. For example, FIG. 1 is a conceptual diagram depicting the inspection of a utility infrastructure asset with Unmanned Aircraft System (UAS) 10, including UAV 14. Unmanned Aircraft System 10 includes UAV operator or pilot 12, UAV 14, augmented-reality (AR) head-mounted device (HMD) 16, ground station 20, and UAV controller 30.

UAV pilot 12 uses UAV controller 30 to control the flightpath 114 of UAV 14, for example, in order to conduct an inspection of structures 22A-22E (collectively, "structures 22"). In the example depicted in FIG. 1, structures 22 are depicted as electrical transmission towers, but structures 22 may include any structure, including pipelines, flare stacks, solar panels, bridges, etc.

For example, pilot 12 may launch UAV 14 from launch location 18 and guide UAV 14 around structures 22 such that a camera or other sensor mounted on UAV 14 may capture data. UAV 14 may, for example, capture photographic or video data through the use of one or more camera-based sensors and may additionally or alternatively capture other types of data, such as temperature data, environmental data, or electromagnetic field data, using other types of sensors mounted on UAV 14.

Pilot 12 may guide UAV 14 along an extended and/or tortuous flightpath 114 in order to capture extensive data during a single launch. For example, at any time during the inspection, UAV 14 could be 1600 meters away from pilot 12 while conducting the inspection mission. The distance UAV 14 may travel from pilot 12 may be limited only by the battery life of UAV 14 and/or the radio communication range of controller 30.

Federal Aviation Administration (FAA) Small-UAS Rule § 107.31[1] requires that a UAV pilot must maintain a line-of-sight (LOS) with the UAV at all times during operation. A number of factors, including, but not limited to, tortuous terrain, background (e.g., sky) color contrast, weather, or other obstacles may hinder the ability of pilot 12 to maintain a line-of-sight with UAV 14.

[1] https://www.ecfr.gov/cgi-bin/text-idx?SID= dc908fb739912b0e6dcb7d7d88cfe6a7&mc=true&node=pt14.2.107&rgn= div5#se14.2.107_131.

In some examples of this disclosure, pilot 12 may wear HMD 16, having therein processing circuitry configured to determine a location of UAV 14 with respect to the field-of-view (FOV) 26 of HMD 16, and output for display on a transparent display screen of HMD 16 an indication of the relative location of UAV 14, in order to assist pilot 12 to maintain and/or re-obtain line-of-sight 24 with UAV 14. In some examples, such as when UAV 14 is localized within the FOV 26 of HMD 16, HMD 16 may display a bounding box around the approximate location of UAV 14 on the screen. In other examples, such as when UAV 14 is not localized within the FOV 26 of HMD 16, HMD 16 may display information indicating the relative location of UAV 14, such as a set of arrows directing pilot 12 to turn his or her head in order to bring UAV 14 back within FOV 26 of HMD 16. As detailed further below, HMD 16 may be configured to display other relevant UAV flight information to pilot 12, including but not limited to a UAV airspeed and/or direction, a distance from the UAV, a remaining UAV battery life, an intended UAV flightpath, or an indication of a controlled airspace 28 that UAV 14 must avoid.

Figure 2:
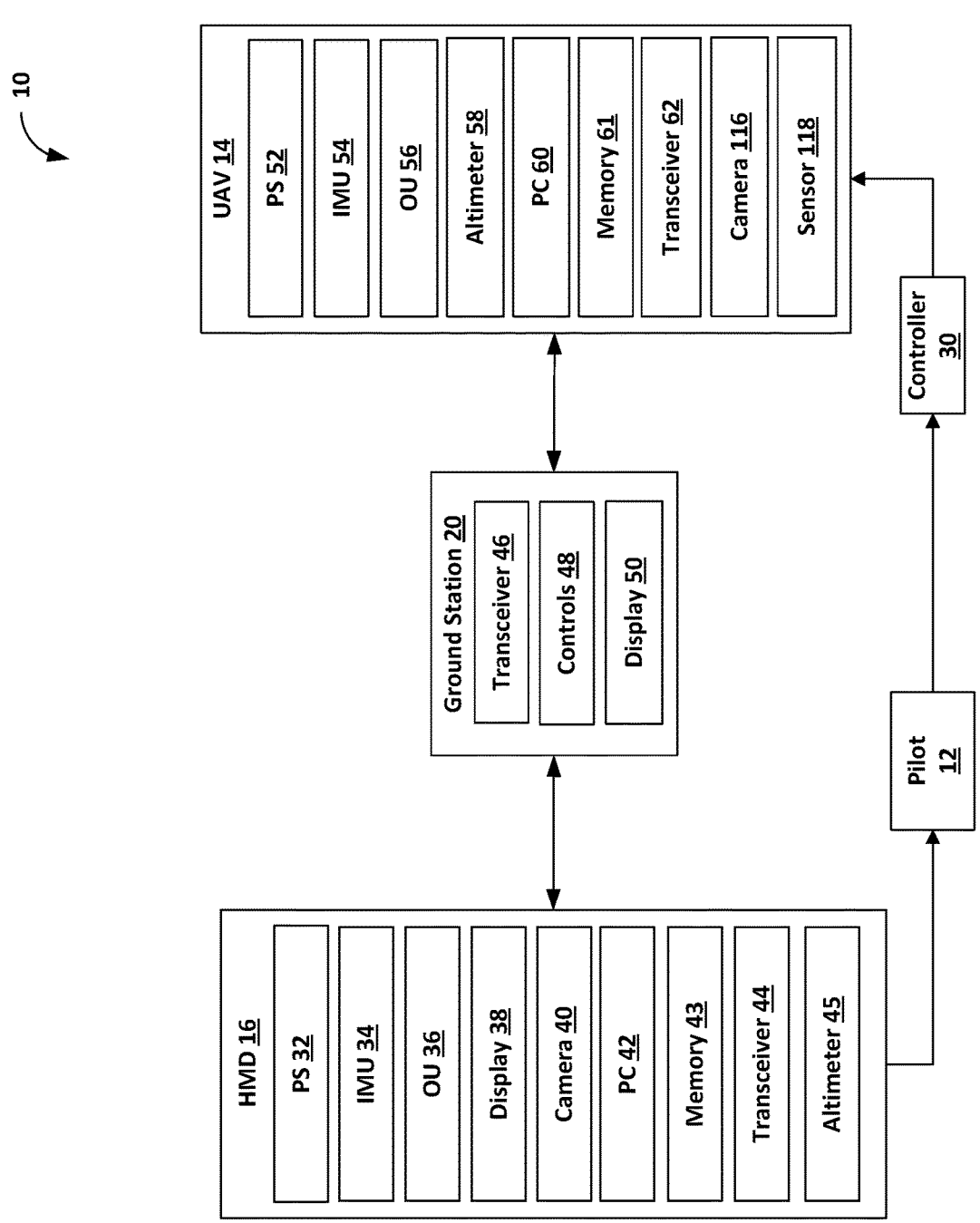
FIG. 2 is a block diagram illustrating an example system for determining a position of a UAV with respect to a field-of-view (FOV) of a head-mounted display (HMD).

FIG. 2 is a block diagram illustrating system 10 of FIG. 1 for determining a position of UAV 14 with respect to the FOV of HMD 16. Example system 10 includes pilot 12, UAV 14, HMD 16, ground station 20, and UAV controller 30.

Pilot 12 is a person who guides UAV 14 along a flightpath, such as to take aerial photographs, collect sensor data, or deliver a package, for example. UAV 14 is depicted (in FIG. 1) as a four-rotor "quadcopter," however, UAV 14 may be any type of UAV including, but not limited to, a rotorcraft, a fixed-wing aircraft, compound aircraft such as tilt-rotor, X2 and X3, an aerostat, or any other such type of UAV including all vertical take-off and landing (VTOL), tail-sitter, etc. UAV 14 may be configured to fly with various degrees of autonomy. Although the techniques of this disclosure are not limited to any particular type of UAV, UAV 14 may, for example, be a relatively small, low-altitude, and low-airspeed UAV, where in this context, "small" corresponds to under 100 lbs., "low-altitude" corresponds to operating altitudes less than 3000 feet above ground, and "low-airspeed" corresponds to air speeds less than 250 knots. Furthermore, it is contemplated that UAV 14 may have hovering capabilities, meaning UAV 14 may have the capability of remaining at an approximately constant location in the air.

UAV 14 includes positioning system (PS) 52, inertial measurement unit (IMU) 54, orientation unit (OU) 56, altimeter 58, processing circuitry (PC) 60, memory 61, transceiver 62, camera 116, and sensor 118. Various components, modules, or units are described in this disclosure to emphasize functional aspects of devices configured to perform the disclosed techniques, but do not necessarily require realization by different hardware units. Although shown separately in FIG. 2 for purposes of illustrations, many of the described components of UAV 14 may in fact be highly integrated. For example, many of the described components of UAV 14 may be implemented into a single circuit or into a system on a chip. Various units or more modules may be combined into a single hardware unit or provided by a collection of interoperative hardware units, including one or more processors, in conjunction with suitable software and/or firmware.

Positioning System (PS) 52 includes any hardware and/or software configured to determine a relative location, such as a geolocation, of UAV 14. In some examples, PS 52 may include a GPS system configured to determine a latitude and longitude of UAV 14. In other examples, PS 52 may be configured to determine a location of UAV 14 based on nearby wireless internet signals, cell tower signals, or transponder signals. In yet other examples, positioning system 52 may include camera-based positioning systems. Generally speaking, positioning system 52 may include any one of or variety of types of positioning systems and is not limited to any one particular type of positioning system.

Inertial Measurement Unit (IMU) 54 is an electronic component or device configured to detect an acceleration, motion, and/or orientation of UAV 14. IMU 54 may include one or more accelerometers, gyroscopes, and/or magnetometers. IMU 54, alone or in combination with OU 56, may be configured to output data indicative of a direction of flight of UAV 14.

Orientation Unit (OU) 56 includes one or more devices configured to determine a relative orientation of UAV 14 with respect to the cardinal directions of the Earth. For example, OU 56 may include a magnetometer configured to measure a strength and direction of the Earth's magnetic field to identify the northern direction. In other examples, OU 56 includes a simple compass configured to identify the direction of magnetic north. In some examples, processing circuitry 60 may be configured to combine magnetic-based orientation data from OU 56 with location data from PS 52 in order to determine the orientation of UAV 14 relative to True North (as defined by Earth's axis of rotation). In other examples, OU 56 may be camera-based and usual visual landmarks to determine an orientation of UAV 14.

Altimeter 58 is a device or component for determining a height of UAV 14 above the ground. In some examples, altimeter 58 may include a device configured to determine the altitude of UAV 14 based on atmospheric pressure. Altimeter 58 may include data from positioning system 52 to determine altitude based on a difference between a measured atmospheric pressure and the expected atmospheric pressure at the known elevation of ground level at the local latitude and longitude, as indicated by positioning system 52. In other examples, altimeter 58 may include a signal transceiver configured to reflect a signal, such as an electromagnetic, sonar, or other signal, off of the ground and measure the time until the reflected signal is detected. In other examples, altimeter 58 may use stereoscopic images to determine an altitude.

UAV 14 includes processing circuitry (PC) 60 and memory 61 configured to process and store data, such as data received from transceiver 62 or from any other internal component of UAV 14. PC 60 may include one or more processors configured to execute instructions, such as one or more digital signal processors (DSPs), general purpose microprocessors, ASICs, FPGAs, or other equivalent integrated or discrete logic circuitry. Processing circuitry 60 may include analog and/or digital circuitry. The term "processor" or "processing circuitry," as used herein, may refer to any of the foregoing structure or any other structure suitable for implementation of the techniques described herein.

Memory 61 may be formed by any of a variety of memory devices, such as dynamic random access memory (DRAM), including synchronous DRAM (SDRAM), magnetoresistive RAM (MRAM), resistive RAM (RRAM), or other types of memory devices. Memory 61 may include one or more of a hard drive, flash memory, volatile or non-volatile memory, or any other suitable digital storage media for storing encoded video data Transceiver 62 includes one or more electronic components configured to wirelessly send and receive data, such as from ground station 20, controller 30, or HMD 16. Transceiver 62 may represent any one or more of wireless transmitters/receivers, modems, networking components, wireless communication components that operate according to any of a variety of IEEE 802.11 standards, or other physical components. Transceiver 62 may be configured to transfer data according to a cellular communication standard, such as 4G, 4G-LTE (Long-Term Evolution), LTE Advanced, 5G, or the like, or according to other wireless standards, such as an IEEE 802.11 specification, an IEEE 802.15 specification (e.g., ZigBee™), a Bluetooth™ standard, or the like.

UAV 14 includes camera 116 and/or additional sensor 118 configured to capture photographic or other data of a designated target, such as a structure. Camera 116 may represent one or both of a monoscopic camera or stereoscopic camera configured to acquire images and/or video data. UAV 14 may store the images and video in memory 61 or may additionally or alternatively stream the images and video to another device, such as ground station 20.

HMD 16 includes positioning system (PS) 32, inertial measurement unit (IMU) 34, orientation unit (OU) 36, display 38, camera 40, processing circuitry (PC) 42, memory 43, transceiver 44, and altimeter 45. HMD 16 is a head-mounted device that can include a variety of electronic components found in a computing system, including one or more processor(s) 42 (e.g., microprocessors or other types of processing units) and a memory 43 that may be mounted on or within a frame. Furthermore, HMD 16 may include a transparent display screen 38 that is positioned at eye level when HMD 16 is worn by a user, such as UAV pilot 12. In some examples, display screen 38 can include one or more liquid crystal displays (LCDs) or other types of display screens on which images are perceptible to UAV pilot 12 who is wearing or otherwise using HMD 16 via display 38. Other display examples include organic light emitting diode (OLED) displays. In some examples, HMD 16 can operate to project 3D images onto the user's retinas using techniques known in the art.

In some examples, display 38 may include see-through holographic lenses. sometimes referred to as waveguides, that permit a user to see real-world objects through (e.g., beyond) the lenses and also see holographic imagery projected into the lenses and onto the user's retinas by displays, such as liquid crystal on silicon (LCoS) display devices, which are sometimes referred to as light engines or projectors, operating as an example of a holographic projection system within HMD 16. In other words, HMD 16 may include one or more see-through holographic lenses to present virtual images to a user. Hence, in some examples, HMD 16 can operate to project 3D images onto the user's retinas via display 38, e.g., formed by holographic lenses. In this manner, HMD 16 may be configured to present a3D virtual image to a user within a real-world view observed through display 38, e.g., such that the virtual image appears to form part of the real-world environment. In some examples, HMD 16 may be a Microsoft HOLOLENS™ headset, available from Microsoft Corporation, of Redmond, Wash., USA, or a similar device, such as, for example, a similar MR visualization device that includes waveguides. The HOLOLENS™ device can be used to present 3D virtual objects via holographic lenses, or waveguides, while permitting a user to view actual objects in a real-world scene, i.e., in a real-world environment, through the holographic lenses.

In other examples, display screen 38 may include an opaque (e.g., non-transparent) digital screen configured to display rendered imagery. Some non-limiting examples of devices having opaque display screens include the RealWear HMT-1, the Vuzix M300, or any standard smartphone or tablet. In the case of an AR HMD having an opaque display screen 38, the user's optical axis (e.g., line of sight, or the center of the field of view) may differ slightly from the optical axis of camera 40. In some examples, an AR HMD may have a display screen 38 configured to cover only one eye of a user ("monocular") or both eyes ("binocular").

Figure 4:
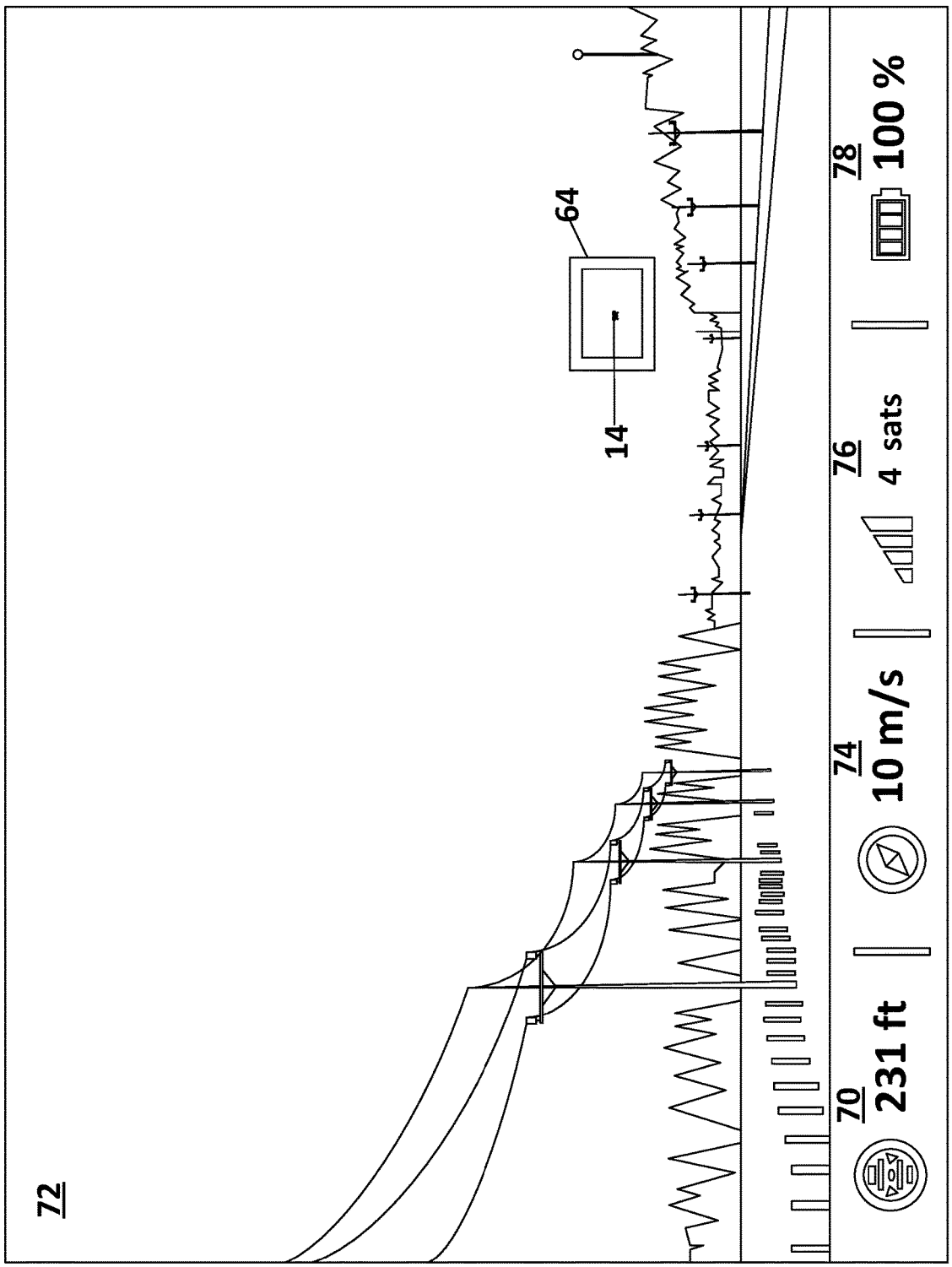
FIG. 4 is an example graphical user interface (GUI) that may be generated and displayed on an HMD according to one or more techniques of this disclosure.
Figure 5:
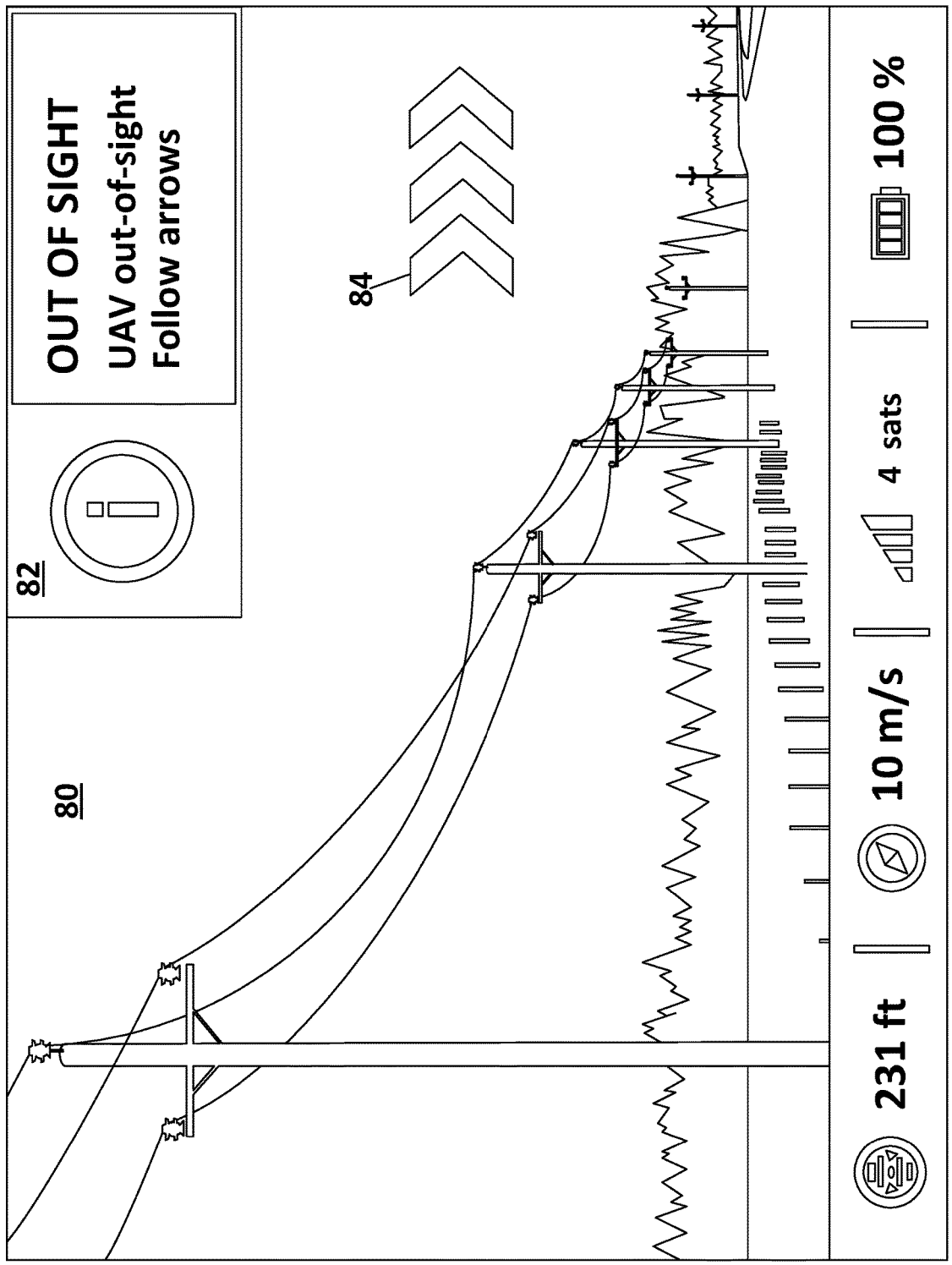
FIG. 5 is another example GUI that may be generated and displayed on an HMD according to one or more techniques of this disclosure.
Figure 6:
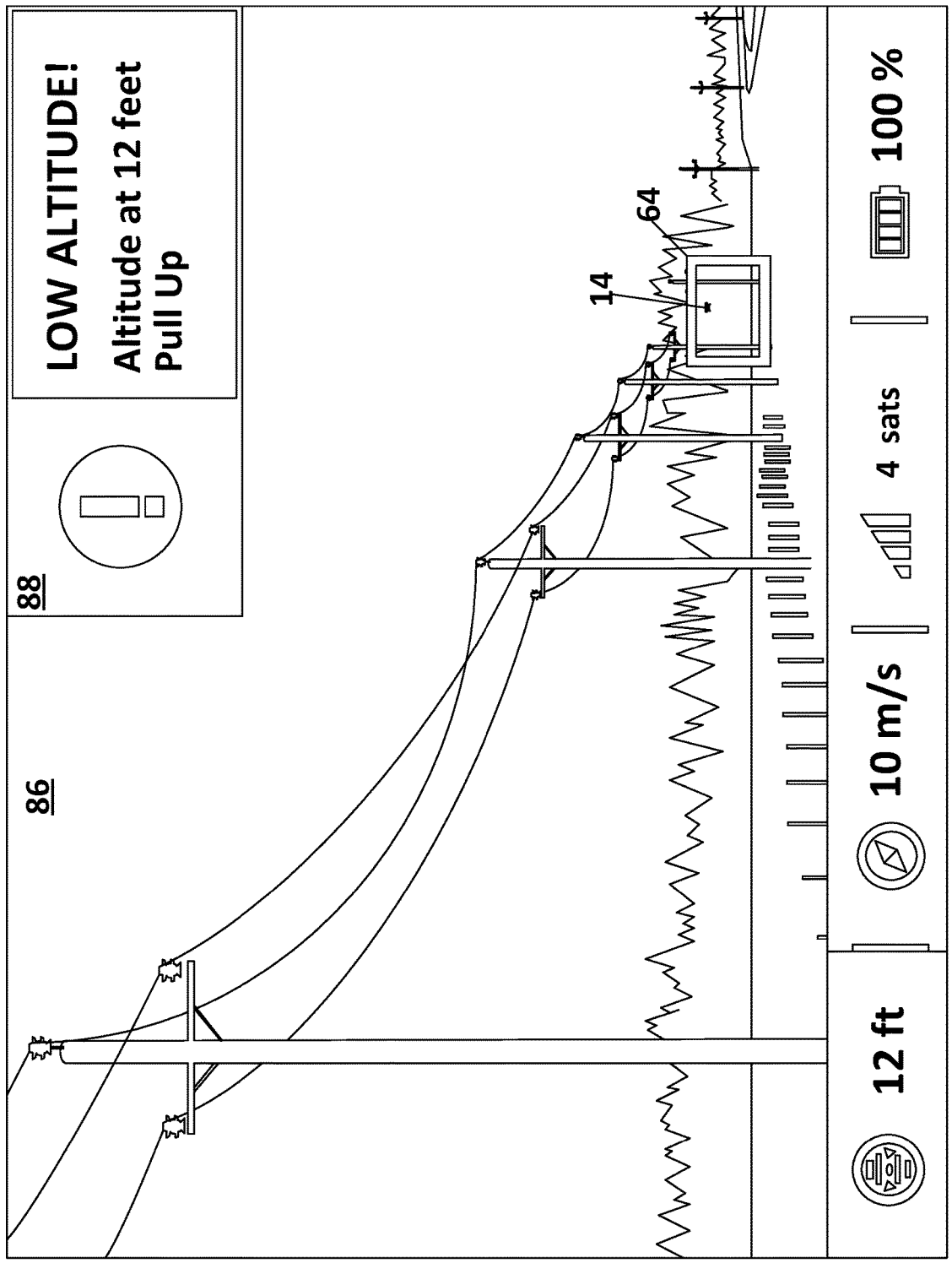
FIG. 6 is another example GUI that may be generated and displayed on an HMD according to one or more techniques of this disclosure.

As shown in FIGS. 4-6, HMD 16 can also generate a graphical display or user interface (UI) that is visible to the user, e.g., as holographic imagery projected into see-through holographic lenses as described above. Imagery presented by HMD 16 may include, for example, one or more 3D virtual objects. Details of example UIs are described elsewhere in this disclosure. HMD 16 also can include a speaker or other sensory devices that may be positioned adjacent the user's ears. Sensory devices can convey audible information or other perceptible information (e.g., vibrations) to assist the user of HMD 16.

HMD 16 can also include a transceiver 44 to connect HMD 16 to a second processing device, such as intermediate ground station 20, or directly to UAV 14, and/or to a network and/or to a computing cloud, such as via a wired communication protocol or a wireless protocol, e.g., Wi-Fi, Bluetooth, etc. Transceiver 44 may represent any one or more of wireless transmitters/receivers, modems, networking components, wireless communication components that operate according to any of a variety of IEEE 802.11 standards, or other physical components. Transceiver 44 may be configured to transfer data according to a cellular communication standard, such as 4G, 4G-LTE (Long-Term Evolution), LTE Advanced, 5G, or the like, or according to other wireless standards, such as an IEEE 802.11 specification, an IEEE 802.15 specification (e.g., ZigBee™), a Bluetooth™ standard, or the like.

HMD 16 also includes a variety of sensors to collect sensor data, such as one or more optical camera(s) 40 (or other optical sensors) and one or more depth camera(s) (or other depth sensors), mounted to, on or within the frame. In some examples, the optical sensor(s) 40 are operable to scan the geometry of the physical environment in which user of HMD 16 is located and collect two-dimensional (2D) optical image data (either monochrome or color). Depth sensor(s) are operable to provide 3D image data, such as by employing time of flight, stereo or other known or future-developed techniques for determining depth and thereby generating image data in three dimensions. Camera 40 may represent one or both of a monoscopic camera or stereoscopic camera configured to acquire images and/or video data. HMD 16 may store the images and video in memory 43 or may additionally or alternatively stream the images and video to another device, such as ground station 20. Other sensors can include motion sensors (e.g., Inertial Mass Unit (IMU) sensors 34, accelerometers, etc.) to assist with tracking movement.

System 10 processes the sensor data so that geometric, environmental, textural, etc. landmarks (e.g., corners, edges or other lines, walls, floors, objects) in the user's environment or "scene" can be defined and movements within the scene can be detected. As an example, the various types of sensor data can be combined or fused so that the user of HMD 16 can perceive 3D images that can be positioned, or fixed and/or moved within the scene. When fixed in the scene, the user can walk around the 3D image, view the 3D image from different perspectives, and manipulate the 3D image within the scene using hand gestures, voice commands, gaze line (or direction) and/or other control inputs. As another example, the sensor data can be processed so that the user can position a3D virtual object (e.g., a bounding box) on an observed physical object in the scene (e.g., UAV 14) and/or orient the 3D virtual object with other virtual images displayed in the scene.

HMD 16 may include one or more processors, or processing circuitry (PC) 42 and memory 43, e.g., within the frame of the HMD. PC 42 may include one or more processors configured to execute instructions, such as one or more digital signal processors (DSPs), general purpose microprocessors, ASICs, FPGAs, or other equivalent integrated or discrete logic circuitry. Processing circuitry 42 may include analog and/or digital circuitry. The term "processor" or "processing circuitry," as used herein, may refer to any of the foregoing structure or any other structure suitable for implementation of the techniques described herein.

Memory 43 may be formed by any of a variety of memory devices, such as dynamic random access memory (DRAM), including synchronous DRAM (SDRAM), magnetoresistive RAM (MRAM), resistive RAM (RRAM), or other types of memory devices. Memory 43 may include one or more of a hard drive, flash memory, volatile or non-volatile memory, or any other suitable digital storage media for storing encoded video data.

In some examples, one or more external computing resources process and store information, such as sensor data, instead of or in addition to in-frame PC 42 and memory 43. In this way, data processing and storage may be performed by one or more PC 42 and memory 43 within HMD 16 and/or some of the processing and storage requirements may be offloaded from HMD 16. Hence, in some examples, one or more PC that control the operation of HMD 16 may be within the HMD, e.g., as PC 42. Alternatively, in some examples, at least one of the processors that controls the operation of HMD 16 may be external to the HMD. Likewise, operation of HMD 16 may, in some examples, be controlled in part by a combination one or more PC 42 within the visualization device and one or more processors external to the visualization device.

For instance, in some examples, when HMD 16 is in the context of FIG. 2, processing of the sensor data can be performed by PC 42 in conjunction with memory 43 or storage device(s). In some examples, PC 42 and memory 43 mounted to the frame may provide sufficient computing resources to process the sensor data collected by cameras 40 and motion sensors 34. In some examples, the sensor data can be processed using a Simultaneous Localization and Mapping (SLAM) algorithm, or other known or future-developed algorithm for processing and mapping 2D and 3D image data and tracking the position of HMD 16 in the 3D scene. In some examples, image tracking may be performed using sensor processing and tracking functionality provided by the Microsoft HOLOLENS™ system, e.g., by one or more sensors and processors 42 within HMD 16 substantially conforming to the Microsoft HOLOLENS™ device or a similar mixed reality (MR) visualization device.

HMD 16 includes Positioning System (PS) 32. PS 32 includes any hardware and/or software configured to determine a relative location, such as a geolocation, of HMD 16. In some examples, PS 32 may include a GPS system configured to determine a latitude and longitude of HMD 16. In other examples, PS 32 may be configured to determine a location of HMD 16 based on nearby wireless internet signals, cell tower signals, or transponder signals. In yet other examples, positioning system 32 may include camera-based positioning systems. Generally speaking, positioning system 32 may include any one of or variety of types of positioning systems and is not limited to any one particular type of positioning system.

HMD 16 includes Inertial Measurement Unit (IMU) 34. IMU 34 is an electronic component or device configured to detect an acceleration, motion, and/or orientation of HMD 16, such as with respect to gravity. IMU 34 may include one or more accelerometers, gyroscopes, and/or magnetometers. IMU 34 may be configured to output data indicative of an angle of HMD 16 with respect to gravity, correspondingly indicative of an angle of the field-of-view of HMD 16 with respect to the ground, which may be assumed to be locally perpendicular to the direction of gravity.

HMD 16 includes orientation unit (OU) 36. OU 36 includes one or more devices configured to determine a relative orientation of HMD 16 with respect to the cardinal directions of the Earth. For example, OU 36 may include a magnetometer configured to measure a strength and direction of the Earth's magnetic field to identify the northern direction. In other examples, OU 36 includes a simple compass configured to identify the direction of magnetic north. In some examples, processing circuitry 42 may be configured to combine magnetic-based orientation data from OU 36 with location data from PS 32 in order to determine the orientation of HMD 16 relative to True North (as defined by Earth's axis of rotation). In other examples, OU 36 may be camera-based and usual visual landmarks to determine an orientation of HMD 16.

In some examples, HMD 16 includes altimeter 45. Altimeter 45 includes hardware and/or software for determining a height of HMD 16 above the ground. In some examples, the height of HMD 16, when worn on the head of pilot 12, is essentially negligible relative to the height of UAV 14 above the ground while in flight. In these examples, PC 42 determines the height of HMD 16 to be zero for the purposes of determining the relative location of UAV 14. In other examples, altimeter 45 may include a device configured to determine the altitude of HMD 16 based on atmospheric pressure. Altimeter 45 may include data from positioning system 32 to determine altitude based on a difference between a measured atmospheric pressure and the expected atmospheric pressure at the known elevation of ground level at the local latitude and longitude, as indicated by positioning system 32. In other examples, altimeter may include a signal transceiver configured to reflect a signal, such as an electromagnetic, sonar, or other signal, off of the ground and measure the time until the reflected signal is detected. Since HMD 16 is worn on the head of pilot 12, in other examples, altimeter 45 may include a data input device for pilot 12 to input his or her height, approximately corresponding to the height of HMD 16 above the ground when pilot 12 is standing erect. In other examples, altimeter 45 may use stereoscopic images to determine an altitude.

Ground Station (GS) 20 is a ground-based computing device that includes transceiver 46, controls 48, and display 50. In some examples, GS 20 is a fixed communication station, such as a radio tower. In other examples, GS 20 is a mobile computing device, such as a laptop, tablet, smartphone, or other computing device. As shown in FIG. 2, GS 20 is configured to send and receive data, via transceiver 46, from both UAV 14 and HMD 16. In some examples, UAV 14 is configured to communicate directly with HMD 16.

GS 20 includes one or more controls 48, such as a keyboard, touchscreen, buttons, throttle, or other similar user-input devices. GS 20 further includes display 50, such as a screen configured to display camera, sensor, and/or flight data from UAV 14. In some examples, display screen 50 is configured to display a live video feed, as captured by camera 116 on UAV 14. In some examples, ground station 20 includes transceiver 46 configured to receive telemetry data from sensors 118 of UAV 14 and wirelessly communicate the telemetry data to transceiver 44 of HMD 16.

In some examples, system 10 can also include one or more user-operated control device(s) (controller(s)) 30 that allow the user to operate UAV 14, interact with UIs and/or otherwise provide commands or requests to processing device(s) or other systems connected to the network. As examples, controller 30 can include a microphone, a touch pad, a control panel, a motion sensor or other types of control input devices with which the user can interact. In some examples, controller 30 may be incorporated within GS 20. In other examples, controller 30 may be incorporated within HMD 16. In other examples, controller 30 is a distinct, handheld device having one or more buttons, toggles, touchscreens, or other similar control inputs configured to control the motion of UAV 14.

In some examples in accordance with this disclosure, and as detailed further with respect to FIGS. 3A-3D, below, processing circuitry 42 of HMD 16 is configured to receive location data from UAV 14 and at least location data from HMD 16, and use the received data to determine a location of UAV 14 with respect to the FOV of display screen 38 of HMD 16. The FOV of HMD 16, between HMD 16 and UAV 14, may assume the shape of a rectangular frustum, having an expanding horizontal width dimension and an expanding height dimension, both dimensions taken perpendicular to a line extending from HMD 16 to the center "C" of the field-of-view at the distance of UAV 14. For example, processing circuitry 42 within HMD 16 may be configured to determine, based on the received location and orientation data, both a horizontal position (FIGS. 3A-3B) and a vertical position (FIGS. 3C-3D) of UAV 14 with respect to the center "C" of the FOV of HMD 16. The example methods and processes (e.g., the specific disclosed calculations) of FIGS. 3A-3D are recited only as examples, and are not intended to be limiting.

Figure 3A:
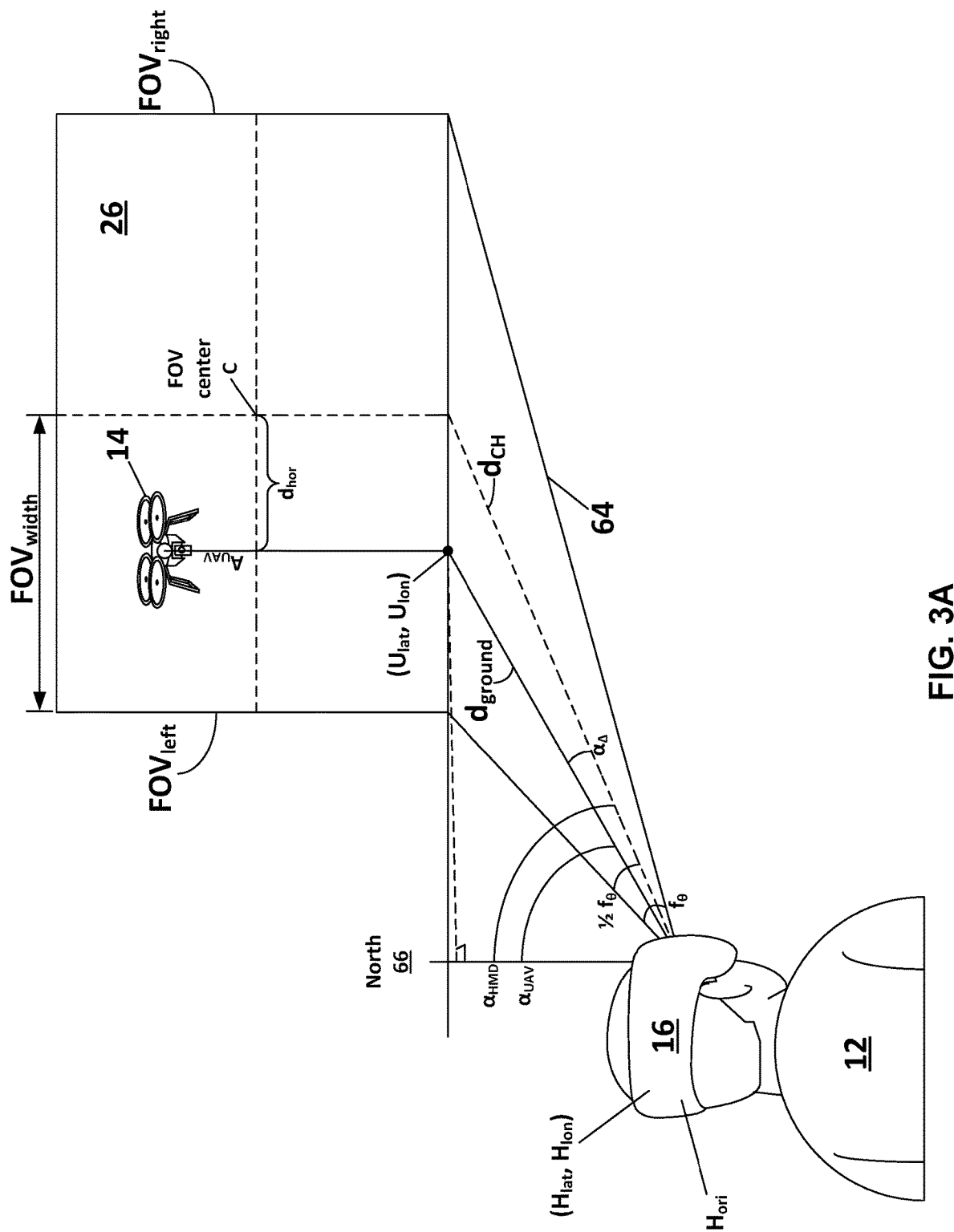
FIG. 3A is a conceptual diagram illustrating an HMD determining a horizontal location of a UAV with respect to an FOV of the HMD, according to one or more techniques of this disclosure.

FIG. 3A is a conceptual diagram illustrating an example process for determining a horizontal position of UAV 14 with respect to FOV 26 of HMD 16, according to one or more techniques of this disclosure. In order to determine whether UAV 14 is located within the horizontal FOV of HMD 16, HMD 16 (e.g., processing circuitry 42 within HMD 16) determines the magnitudes of two horizontal distances: (1) a width $FOV_{width}$ between the center "C" of the field-of-view 26 of HMD 16 and the left edge $FOV_{left}$ (or equivalently, the right edge $FOV_{right}$) of the FOV at the distance of the UAV 14; and (2) the horizontal distance $d_{hor}$ between UAV 14 and $FOV_{center}$. Once HMD 16 determines the values (e.g., magnitudes) of $FOV_{width}$ and $d_{hor}$, HMD 16 compares the two values to determine whether UAV 14 is located within the horizontal width of FOV 26. For example, if $d_{hor}$ is less than $FOV_{width}$, then UAV 14 is located within the horizontal width of FOV 26. If $d_{hor}$ is greater than $FOV_{width}$, then UAV 14 is not located within the horizontal width of FOV 26.

Equivalently (e.g., additionally or alternatively), HMD 16 may determine whether the horizontal angle $\alpha_\Delta$ between FOV center C, HMD 16, and UAV 14 is greater than or less than $\frac{1}{2} f_\theta$, wherein $f_\theta$ represents the fixed angle of the horizontal field-of-view of HMD 16. If $\alpha_\Delta$ is less than $\frac{1}{2} f_\theta$, then UAV 14 is located within the horizontal width of FOV 26.

Figure 3B:
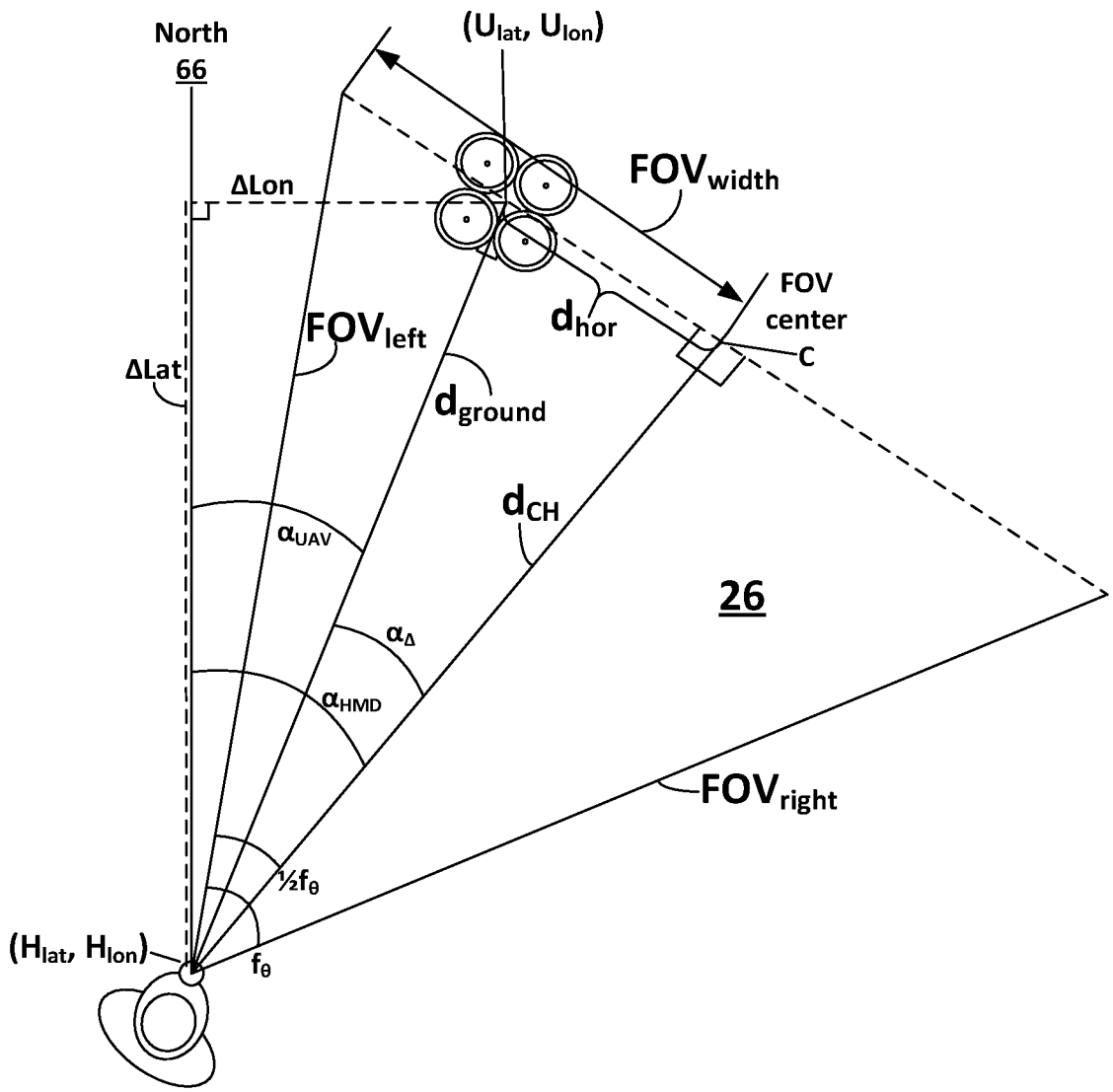
FIG. 3B is an overhead view of the diagram of FIG. 3A.

FIG. 3B is an overhead view of the diagram of FIG. 3A. In one example process, HMD 16 determines the values of $\alpha_\Delta$, $d_{hor}$, and/or $FOV_{width}$ based on one known value and three measured values. The horizontal angle $f_\theta$, defining the horizontal component of field-of-view 26, is a fixed value defined by the size and relative position of display screen 38 and/or camera 40 (FIG. 2) of HMD 16 as manufactured. For example, display screen 38 and camera 40 may each define a field of view which, in some cases, may be substantially aligned with one another. In some examples, the fields of view of display screen 38 and camera 40 may differ slightly, e.g., may not be perfectly aligned, however may be similar enough to be interchanged for the example techniques described herein. Accordingly, HMD 16 (e.g., PC 42 and memory 43) is aware of the fixed value of $\frac{1}{2} f_\theta$.

HMD 16 (e.g., transceiver 44 and/or PC 42) receives three other values measured by various sensors and/or detectors. Positioning system 32 (FIG. 2) of HMD 16 determines a relative location of HMD 16. For example, positioning system 32 may include a GPS device configured to determine a latitude and longitude ($H_{lat}$, $H_{lon}$) of HMD 16. Similarly, positioning system 52 (FIG. 2) of UAV 14 determines a relative location of UAV 14. For example, positioning system 52 may include a GPS device configured to determine a latitude and longitude ($U_{lat}$, $U_{lon}$) of UAV 14. Orientation unit 36 (FIG. 2) within HMD 16 determines a relative orientation of HMD 16. For example, orientation unit 36 may include a compass or magnetometer configured to determine a value for angle $\alpha_{HMD}$, the horizontal angle between FOV center C, HMD 16, and north 66 (e.g., magnetic north and/or true north). Transceiver 44 and/or PC 42 (FIG. 2) within HMD 16 receive data indicative of ($H_{lat}$, $H_{lon}$), ($U_{lat}$, $U_{lon}$), and $\alpha_{HMD}$.

Based on ($H_{lat}$, $H_{lon}$) and ($U_{lat}$, $U_{lon}$), HMD 16 determines distance $d_{ground}$, the horizontal "ground distance" along a straight line between HMD 16 and UAV 14. For example, HMD 16 may implement the Pythagorean Theorem $a^2+b^2=c^2$, wherein "a" is the difference "$\Delta$Lat" between $U_{lat}$ and $H_{lat}$, "b" is the difference "$\Delta$Lon" between $U_{lon}$ and $H_{lon}$, and "c" is equal to $d_{ground}$.

Using the determined values of $d_{ground}$, $\Delta$Lat, and $\Delta$Lon, HMD 16 may determine the value of $\alpha_{UAV}$, the horizontal angle between UAV 14, HMD 16, and north 66. For example, using the known mathematical relationship that $\sin(\theta)=$(opposite/hypotenuse), HMD 16 may determine that the angle $\alpha_{UAV}$ is equal to the inverse sine of ($\Delta$Lon/$d_{ground}$).

Using the measured value of $\alpha_{HMD}$ and the determined value of $\alpha_{UAV}$, HMD 16 may determine the value of $\alpha_\Delta$, as the difference between $\alpha_{HMD}$ and $\alpha_{UAV}$. HMD 16 may then compare the determined value of $\alpha_\Delta$ to the fixed value of $\frac{1}{2} f_\theta$ to determine whether $\alpha_\Delta$ is less than $\frac{1}{2} f_\theta$, and therefore, whether UAV 14 is within the horizontal field-of-view 26 of HMD 16. Using further trigonometric ratios, HMD 16 may similarly determine the values of $FOV_{width}$ and door to determine the approximate horizontal location of UAV 14 within FOV 26 (e.g., the approximate horizontal location of UAV 14 on display screen 38). For example, $d_{hor}$ is equal to $d_{ground}*\sin(\alpha_\Delta)$. Horizontal distance $d_{CH}$ from HMD 16 to FOV center C is equal to $d_{ground}*\cos(\alpha_\Delta)$. $FOV_{width}$ is equal to $d_{CH}*\tan(\frac{1}{2} f_\theta)$.

If HMD 16 determines that UAV 14 is within the horizontal field-of-view, PC 42 may take the ratio of ($d_{hor}$/$FOV_{width}$) to determine the approximate location (as a percent of the screen width) on display screen 38 to place a bounding box indicating the location of UAV 14.

Figure 3C:
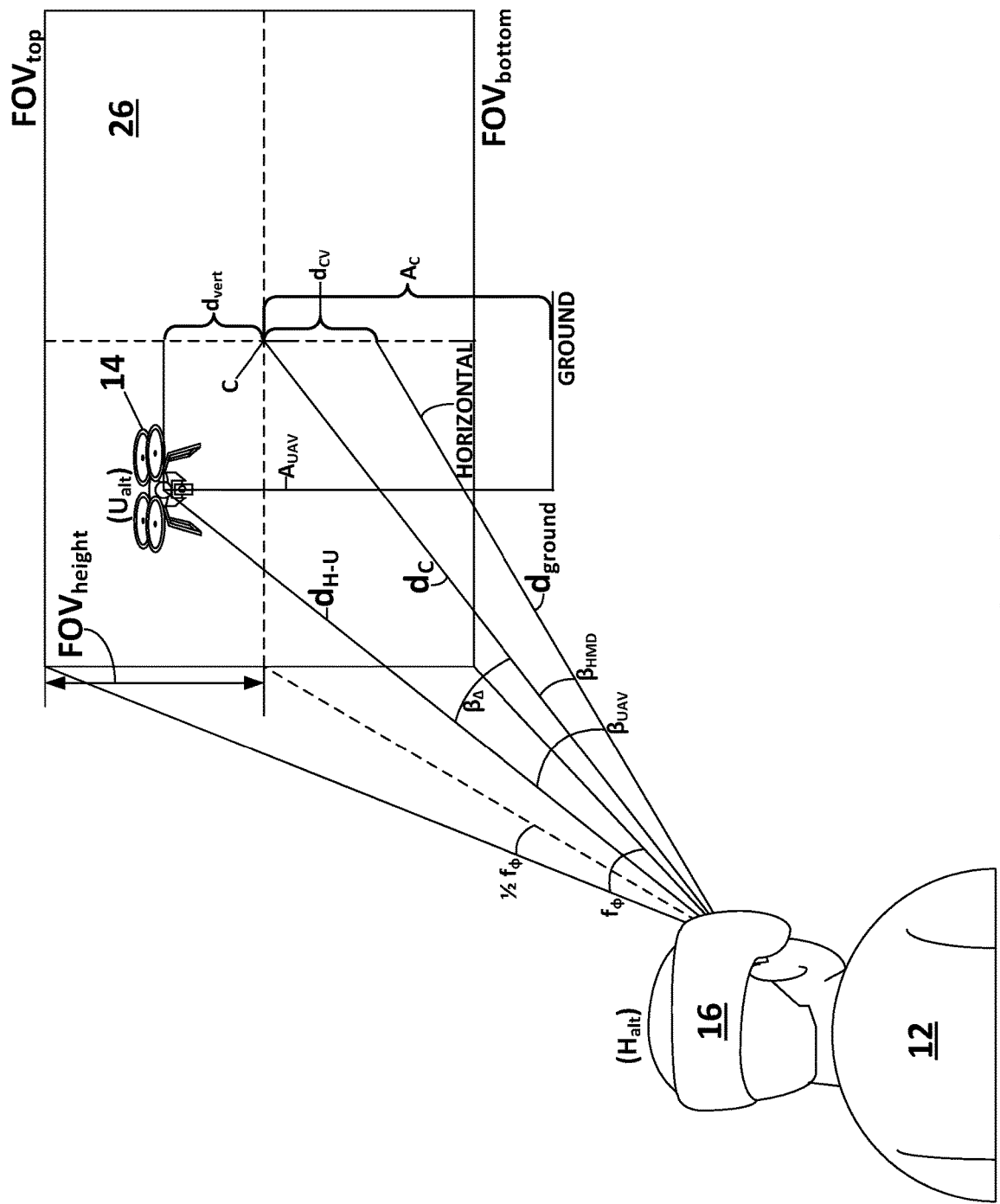
FIG. 3C is a conceptual diagram illustrating an HMD determining a vertical location of a UAV with respect to an FOV of the HMD, according to one or more techniques of this disclosure.

FIG. 3C is a conceptual diagram illustrating an HMD determining a vertical location of a UAV with respect to an FOV of the HMD, according to one or more techniques of this disclosure. HMD 16 (e.g., processing circuitry within HMD 16) determines the magnitudes of two vertical distances: a height $FOV_{height}$ between the center "C" of the field-of-view 26 of HMD 16 and the top edge $FOV_{top}$ (or equivalently, the bottom edge $FOV_{bottom}$) of the FOV at the distance of UAV 14; as well as the vertical distance $d_{vert}$ between UAV 14 and FOV center C. Once HMD 16 determines the values of $FOV_{height}$ and $d_{vert}$, HMD 16 compares the two values to determine whether UAV 14 is located within the vertical height of FOV 26. For example, if $d_{vert}$ is less than $FOV_{height}$, then UAV 14 is located within the vertical height of FOV 26. If $d_{vert}$ is greater than $FOV_{height}$, then UAV 14 is not located within the vertical height of FOV 26.

Equivalently, HMD 16 may determine whether the vertical angle $\beta_A$ between FOV center C, HMD 16, and UAV 14 is greater than or less than $\frac{1}{2} f_\varphi$, wherein $f_\varphi$ represents the fixed angle of the vertical field-of-view of HMD 16. If $\beta_A$ is less than $\frac{1}{2} f_\varphi$, then UAV 14 is located within the vertical height of FOV 26.

Figure 3D:
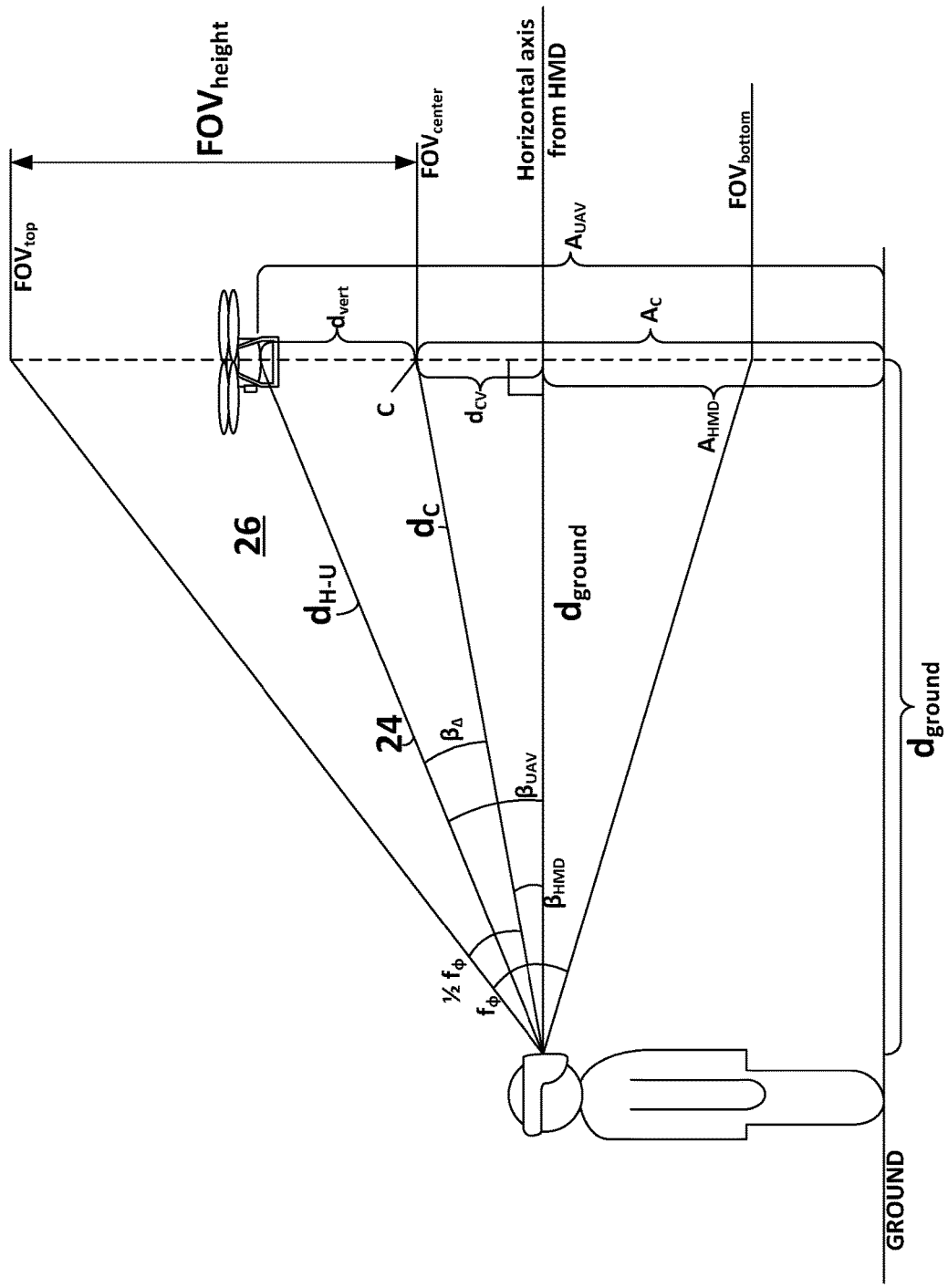
FIG. 3D is a side view of the diagram of FIG. 3C.

FIG. 3D is a side view of the diagram of FIG. 3C. HMD 16 determines the values of $\beta_A$, $d_{vert}$, and/or $FOV_{height}$ based on one or more known and measured values. The vertical angle $f_\varphi$ of the vertical field-of-view 26 is a fixed value defined by the size and relative position of display screen 38 (FIG. 2) of HMD 16 as manufactured. Accordingly, HMD 16 is aware of the value of $\frac{1}{2} f_\varphi$.

HMD 16 receives three other values input or measured by various sensors and/or detectors. HMD 16 determines a height or altitude $A_{HMD}$ of HMD 16 above the ground. For example, since HMD 16 is intended to be worn on the head of pilot 12, $A_{HMD}$ may be approximately equal to the height of pilot 12 if pilot 12 is standing erect while controlling HMD 16. System 10 may include means for receiving input indicating the height of pilot 12. In some examples, HMD 16 may include its own altimeter, similar to altimeter 58 of UAV 14. In some examples, system 10 may assume for simplicity of computation that $A_{HMD}$ is significantly smaller (e.g., negligible) compared to the altitude of UAV 14 while in flight, and accordingly, set $A_{HMD}$ equal to zero.

Altimeter 58 (FIG. 2) of UAV 14 determines a height or altitude $A_{UAV}$ of UAV 14 above the ground. Transceiver 44 (FIG. 2) within HMD 16 receives data indicative of $A_{UAV}$. Inertial measurement unit (IMU) 34 (FIG. 2) within HMD 16 determines a relative orientation of HMD 16 with respect to gravity. For example, IMU 34 may include an accelerometer or other sensor configured to determine a value for angle $\beta_{HMD}$, the vertical angle between a horizontal axis (e.g., parallel to the ground) extending from HMD 16 and field-of-view center C. HMD 16 determines the horizontal ground distance $d_{ground}$ between HMD 16 and UAV 14 as described with respect to FIG. 3B, above.

HMD 16 determines distance $d_{CV}$, the vertical distance between the horizontal axis and FOV center C, as equal to $d_{ground} * \tan(\beta_{HMD})$. Using $d_{CV}$, HMD 16 determines distance $d_{vert}$, the vertical distance between UAV 14 and field-of-view center C, as equal to $(A_{UAV} - A_{HMD} - d_{CV})$.

Using $d_{vert}$, HMD 16 determines angle $\beta_{UAV}$, the angle between the horizontal axis, HMD 16, and UAV 14, as equal to the inverse tangent of $[(d_{vert} + d_{CV})/d_{ground}]$. Using $\beta_{UAV}$, HMD 16 determines $\beta_A$ as the difference between $\beta_{UAV}$ and $\beta_{HMD}$. HMD 16 determines $f_{height}$ as equal to $[d_{ground} * \tangent(\beta_{HMD} + \frac{1}{2} f_\varphi)] - d_{CV}$.

HMD 16 may then compare the determined value of $\beta_A$ to the fixed value of $\frac{1}{2} f_\varphi$ to determine whether $\beta_A$ is less than $\frac{1}{2} f\varphi$, and therefore respectively whether UAV 14 is within the vertical field-of-view 26 of HMD 16. HMD 16 may similarly use the values of $FOV_{height}$ and $d_{vert}$ to determine the approximate vertical location of UAV 14 within FOV 26 (e.g., the approximate vertical location of UAV 14 on display screen 38). Additionally, HMD 16 may use the determined values to further determine the values of AC (the altitude of field-of-view center "C" at the distance of UAV 14), dC (the distance between HMD 16 and field-of-view center C), and $d_{H-U}$ (the distance between HMD 16 and UAV 14 along a direct line-of-sight 24).

If HMD 16 determines that UAV 14 is within the vertical field-of-view, PC 42 may determine the ratio of $(d_{vert}/FOV_{height})$ to determine the approximate location (as a percent of the screen height) on display screen 38 to place a graphical object, such as a bounding box, indicating the location of UAV 14.

FIG. 4 is an example user interface (UI) or graphical user interface (GUI) 72 that may be generated and displayed on display screen 38 of HMD 16 (FIG. 2), according to one or more techniques of this disclosure. In the example GUI 72 depicted in FIG. 4, processing circuitry 42 of HMD 16 (FIG. 2) has determined that a location of UAV 14 is within the field-of-view of display screen 38, according to the example techniques described with respect to FIG. 3. In this case, processing circuitry 42 generates and outputs for display on display screen 38 a graphical object, such as bounding box 64, indicating the location of UAV 14 with respect to the screen. Although FIG. 4 depicts the graphical object as a rectangular bounding box 64, the graphical object may take the form of any graphical indication of the UAV's location, such as any other geometric shape such as a circle or triangle, an approximate outline around UAV 14, or an indication of highlighting, shading, blinking or other visual identification around the image of UAV 14 on display screen 38.

In some examples, HMD 16 (e.g., transceiver 44 within HMD 16) may receive orientation data and inertial data from OU 56 and IMU 54, respectively, such that PC 42 may "predict" a subsequent relative location of UAV 14 and update bounding box 64 accordingly. By determining a position of UAV 14 before UAV 14 arrives at that location, HMD 16 may reduce the "lag time" between the arrival of UAV 14 at a particular location and the display of a bounding box 64 over that location.

GUI 72 further includes a number of virtual elements indicative of data obtained by sensors within UAV 14, HMD 16, or both. For example, GUI 72 includes elements indicating a distance 70 between UAV 14 and HMD 16, an airspeed and orientation 74 of UAV 14, a number of satellites 76 connected to positioning system components 32, 52 (FIG. 2), and an estimated remaining battery life 78 of UAV 14.

FIG. 5 is an example UI or GUI 80 that may be generated and displayed on display screen 38 of HMD 16 (FIG. 2), according to one or more techniques of this disclosure. In the example GUI 80 depicted in FIG. 5, processing circuitry 42 of HMD 16 (FIG. 2) has determined that the location of UAV 14 is not within the field-of-view of display screen 38, according to the example techniques described with respect to FIG. 3. In this case, processing circuitry 42 generates and outputs for display on display screen 38 a textual alert 82 indicating that UAV pilot 12 has lost the line-of-sight with UAV 14. In some examples, HMD 16 may additionally or alternatively output an audio alert indicating the same. GUI 80 further includes a graphical object, such as a set of arrows 84, indicating to the pilot 12 which direction to turn their head in order to bring UAV 14 back within the field-of-view of display screen 38. Although FIG. 5 depicts the graphical object as set of arrows 84, the graphical object may take any other direction-indicating form, such as a single arrow or a flashing light along a respective edge of display screen 38. In some examples, additional or alternative to a graphical object, HMD 16 may output an audible indication, such as a tone or sound in the respective ear of the wearer, indicating a direction for the wearer to turn his or her head.

FIG. 6 is an example UI or GUI 86 that may be generated and displayed on display screen 38 of HMD 16 (FIG. 2), according to one or more techniques of this disclosure. In the example GUI 86 depicted in FIG. 6, processing circuitry 42 of HMD 16 (FIG. 2) has determined that the location of UAV 14 is within the field-of-view of display screen 38 and has generated bonding box 64 around the UAV's location. However, transceiver 44 of HMD 16 has received data from altimeter 58 of UAV 14 indicating that UAV 14 is flying too low and may be at risk of crashing into the ground. In this case, processing circuitry 42 generates and outputs for display on display screen 38 a textual alert 88 recommending that UAV pilot 12 should operate controller 30 so as to increase the altitude of UAV 14. In some examples, HMD 16 may additionally or alternatively output an audio alert indicating the same.

In some other examples, processing circuitry 42 may generate and output for display on screen 38 several other virtual or graphical elements not shown in FIG. 6. For example, screen 38 may display a planned flightpath for UAV 14, including an indication, such as a bounding box, of any potential obstacles within the flightpath. In another example, screen 38 may display an indication of a controlled airspace or a "no-fly zone". For example, screen 38 may receive data indicative of an oil refinery and generate a virtual boundary indicating a threshold distance, such as 100 meters, that UAV 14 must remain from the refinery. In some examples, screen 38 may display the live video feed from camera 116 of UAV 14, displayed as a "picture-in-picture" within the larger field-of-view of screen 38. In some examples, screen 38 may display a graphical element indicating the field-of-view of camera 116 of UAV 14, such as a triangular graphical element with UAV 14 at its vertex. In some examples, screen 38 may display a number of other flight indications or warnings, such as indicating a low UAV battery, a lost GPS signal, an obstacle in close proximity, or the completion of one or more mission milestones. For example, processing circuitry 42 may perform image processing on image data captured by camera 40 of HMD 16, camera 116 of UAV 14, or both, in order to recognize one or more obstacles in close proximity to UAV 14, such as birds or nearby aircraft. In other examples, processing circuitry may determine the presence of nearby aircraft when transceiver 44 receives an automatic dependent surveillance broadcast (ADS-B) signal from the aircraft.

Figure 7:
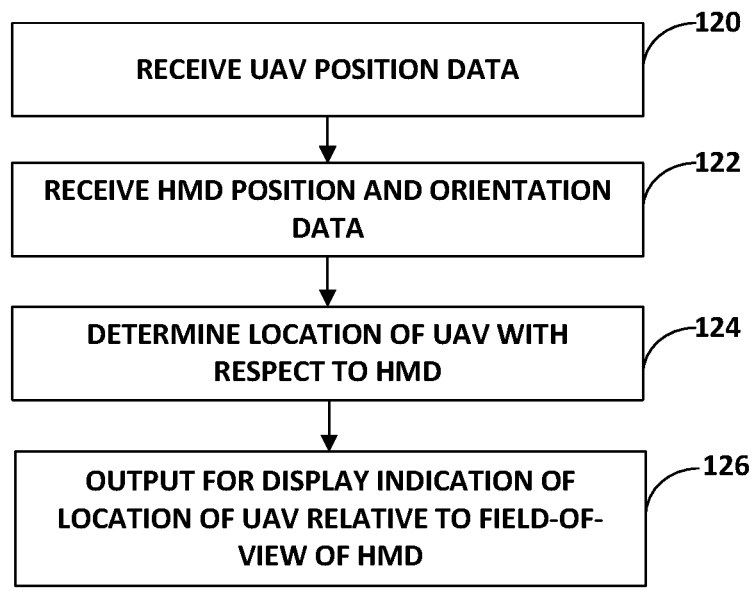
FIG. 7 is a flowchart illustrating an example operation for determining and displaying a location of a UAV with respect to an FOV of an HMD, in accordance with a technique of this disclosure.

FIG. 7 is a flowchart illustrating an example operation for determining and displaying a location of a UAV with respect to an FOV of an HMD, in accordance with a technique of this disclosure. The example techniques of FIG. 7 are described with respect to system 10 of FIGS. 1 and 2, but the techniques may be performed by any adequate computing system. Processing circuitry 42 receives, via transceivers 62 and 44, data indicative of a geolocation of UAV 14, such as from GPS device 52 and altimeter 58 installed within the UAV. Processing circuitry 42 further receives data indicative of an orientation of UAV 14, such as from compass 56 and IMU 54 installed within the UAV (120).

Processing circuitry 42 further receives data indicative of a geolocation of HMD 16, such as from GPS device 32 installed within the HMD. Processing circuitry 42 further receives data indicative of an orientation of HMD 16, such as from compass 36 and IMU 34 installed within the HMD (122).

Processing circuitry 42 determines, from the position and orientation data of both UAV 14 and HMD 16, a relative location of UAV 14 with respect to a field-of-view of display screen 38 of HMD 16 (124). For example, processing circuitry 42 determines whether UAV 14 is within the field-of-view or outside the field-of-view of the screen.

Processing circuitry 42 generates and outputs for display on screen 38 an indication of the location of UAV 14 (126). For example, if UAV 14 is within the field-of-view of display screen 38, processing circuitry 42 generates and outputs a rectangular-shaped bounding box around the approximate location of UAV 14 with respect to the screen. In examples in which UAV 14 is not within the field of view of display screen 38, processing circuitry generates and outputs an indication, such as an arrow or set of arrows, indicating the location of UAV 14 with respect to screen 38, so that the user of HMD 16 may turn his or her head to bring UAV 14 back within the field-of-view.

Figure 8:
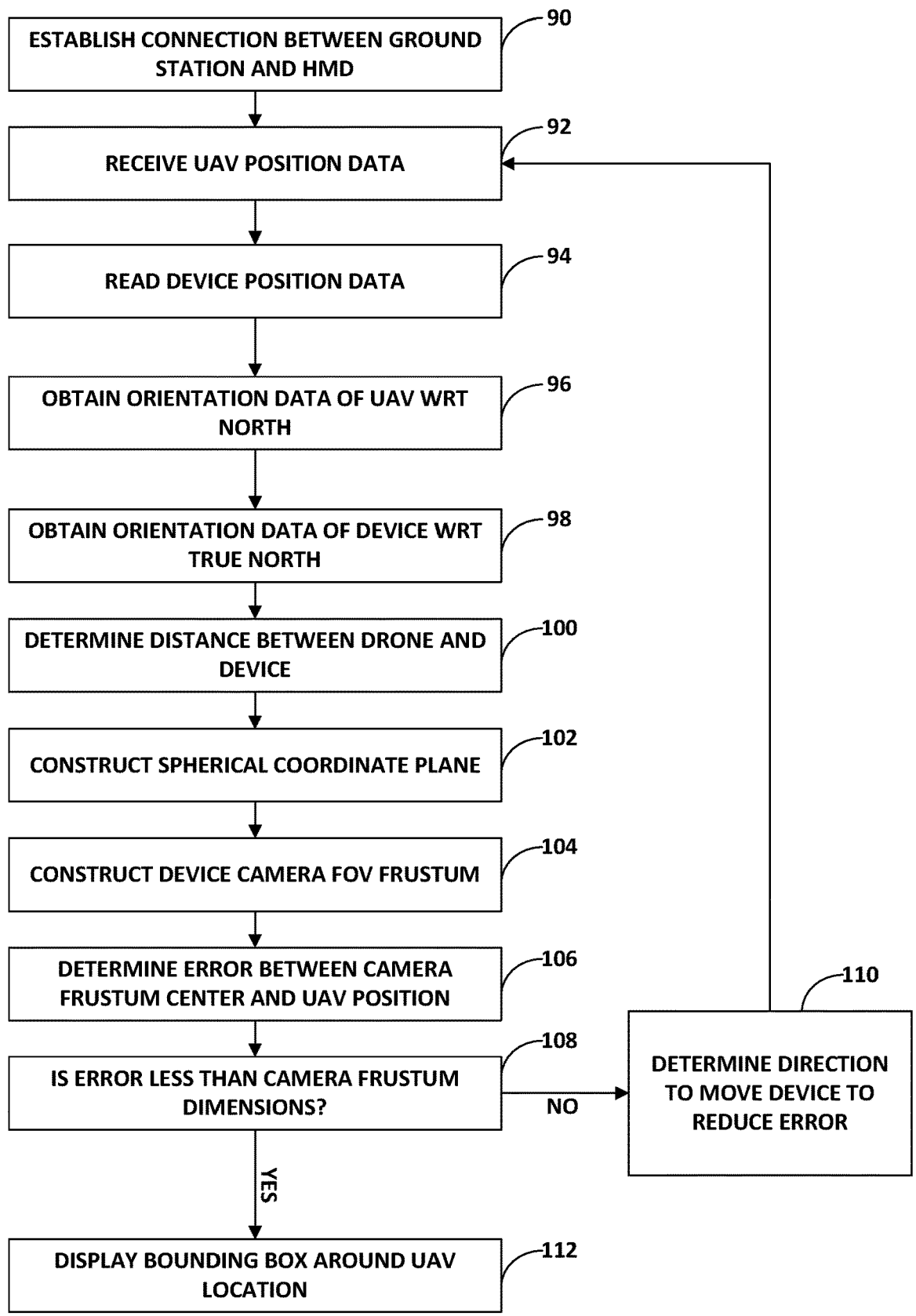
FIG. 8 is a flowchart illustrating an example operation for determining and displaying a location of a UAV with respect to an FOV of an HMD, in accordance with a technique of this disclosure.

FIG. 8 is a flowchart illustrating an example operation for determining and displaying a location of a UAV with respect to an FOV of an HMD, in accordance with a technique of this disclosure. The example techniques of FIG. 8 are described with respect to system 10 of FIGS. 1 and 2, but the techniques may be performed by any adequate computing system. In some examples, HMD 16 establishes a data-communication connection with ground station 20, such as a laptop or other data-transfer device (90). In other examples, HMD 16 communicates directly with UAV 14. HMD 16 receives UAV position data, such as from GPS sensor 52 and an altimeter 58 within UAV 14 (92). HMD 16 receives HMD position data, such as from GPS sensor 32 within HMD 16 (94).

HMD 16 receives UAV orientation data, such as from compass 56 and IMU 54 within UAV 14 (96). HMD 16 receives HMD position data, such as from compass 36 and IMU 34 within HMD 16 (98).

Using the position and orientation data of both HMD 16 and UAV 14, HMD 16 determines a distance between HMD 16 and UAV 14 (100). Processing circuitry 42 within HMD 16 generates a spherical coordinate plane, centered within HMD 16 such that the boundary of the field-of-view of display screen 38 extends along a set of radii of the sphere (102). Based on the spherical coordinate plane, processing circuitry 42 determines a frustum bounded by the field-of-view of camera 40 (104). Processing circuitry 42 determines the distance between the approximate position of UAV 14 and the center of the determined frustum (e.g., the center of the spherical coordinate plane) (106). Processing circuitry 42 determines, based on the distance, whether the location of UAV 14 is within the determined frustum (108).

If UAV 14 is outside the frustum dimensions, processing circuitry 42 determines and indicates a direction to move the frustum (e.g., by the wearer of HMD 16 turning his or her head) in order to reduce the distance between the frustum and UAV 14 (110), and then repeats the previous steps as necessary until UAV 14 is within the frustum dimensions.

If UAV 14 is within the frustum dimensions, processing circuitry 42 generates and outputs for display a graphical indication, such as a rectangular bounding box, around the UAV location (112).

Figure 9:
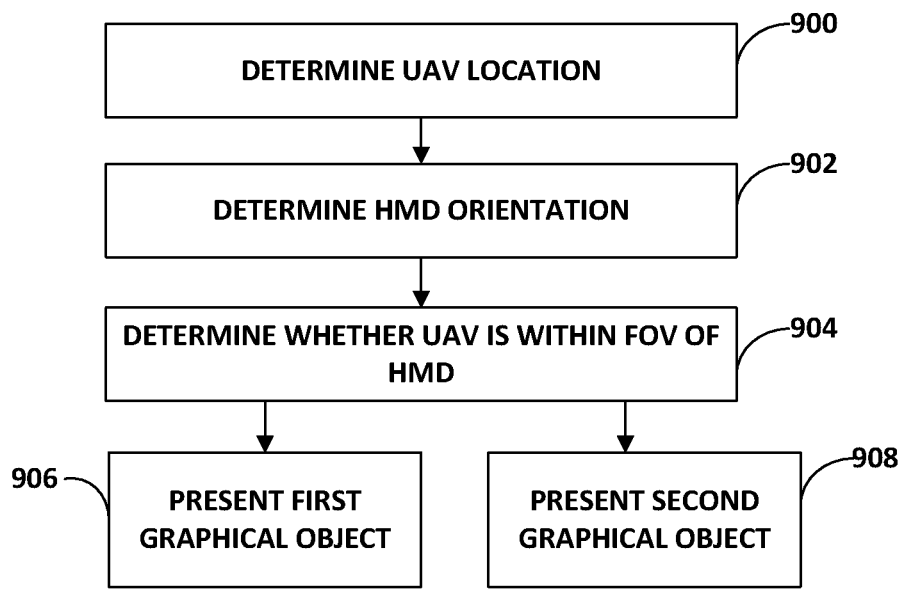
FIG. 9 is a flowchart illustrating an example operation for determining and displaying a location of a UAV with respect to an FOV of an HMD, in accordance with a technique of this disclosure.

FIG. 9 is a flowchart illustrating an example operation for determining and displaying a location of a UAV with respect to an FOV of an HMD, in accordance with a technique of this disclosure. The example techniques of FIG. 9 are described with respect to system 10 of FIGS. 1 and 2, but the techniques may be performed by any adequate computing system. An Unmanned Aerial Vehicle System 10 includes an augmented-reality (AR) head-mounted display (HMD) device 16 having processing circuitry (PC) 42 configured to at least determine a location of an unmanned aerial vehicle (UAV) 14 (900). For example, UAV 14 may include a positioning system (PS) 52, such as a global positioning system (GPS), an altimeter 58, and a transceiver 62 configured to transmit a UAV latitude $U_{lat}$, a UAV longitude $U_{lon}$, and an altitude $A_{UAV}$ of UAV 14 above the ground, to HMD 16.

PC 42 of HMD 16 may also be configured to determine a position and orientation of HMD 16 (902). For example, HMD 16 may include its own positioning system (PS) 32 and an orientation unit (OU) 36 configured to determine an HMD latitude $H_{lat}$, an HMD longitude $H_{lon}$, a cardinal direction heading or bearing $\alpha_{HMD}$, and an angle with respect to gravity $\beta_{HMD}$.

present, on the AR HMD, an indication of the location of the UAV based on the orientation of the AR HMD.

Using at least this data, PC 42 of HMD 16 is configured to determine whether the location of the UAV (including the geolocation and the altitude) of the UAV is within a field-of-view (FOV) of HMD 16 (904). In some examples, PC 42 may construct a grid-based coordinate system to determine whether UAV 14 is positioned within both a horizontal field-of-view and a vertical field-of-view of HMD 16. In other examples, PC 42 may construct a spherical coordinate system centered at HMD 16 and determine whether the angle between the center C of the FOV and UAV 14 is greater than or less than the fixed angle of the FOV of HMD 16. In some examples, PC 42 may determine the relative position of UAV 14 using a combination of both grid-based distances and spherical angles.

Responsive to (e.g., based on) determining whether UAV 14 is within the FOV of HMD 16, PC 42 is configured to generate and present on display screen 38 of AR HMD 16 an indication of the relative location of the UAV. For example, responsive to determining that UAV 14 is within the FOV of HMD 16, PC 42 is configured to present a first graphical object on HMD 16 (906). The first graphical object may include, for example, a bounding box indicating possible locations of the UAV, or any other visual-based UAV-location indication.

PC 42 is also configured, responsive to determining that UAV 14 is not within the FOV of HMD 16, to present a second graphical object on HMD 16 (908). The second graphical object may include, for example, a set of arrows or other visual-based indication of the relative location of UAV 14 with respect to HMD 16.

In some examples, PC 42 is also configured to determine a location of an obstacle near the flightpath of UAV 14, and present, on the AR HMD, an indication of the location of the obstacle based on the orientation of the AR HMD. For example, PC 42 may determine a location of the obstacle by processing image data from an HMD camera 40 or a UAV camera 116, and then display a bounding box around the obstacle on display screen 38. Examples of flightpath obstacles include structures (e.g., buildings, radio towers), birds, manned aircraft (such as airplanes, helicopters, etc.), a second UAV, or terrain (such as rocks, trees, hills, etc.).

In some examples, PC 42 is further configured to determine a location of a controlled airspace and present, on the AR HMD, an indication of the location of the controlled airspace based on the orientation of the AR HMD. For example, a nearby controlled airspace may include airports, oil refineries, sporting venues, or other regulated airspaces having surrounding no-fly threshold distances.

In some examples, PC 42 is configured to determine a field of view of camera 116 of UAV 14 and output for display on HMD 16 an indication of the field of view of camera 116, such that the wearer of HMD 16 may visually determine the general direction of camera 116 and its target capture window.

In some examples, PC 42 may be further configured to determine and output for display one or more of a remaining battery life of UAV 14, an altitude $A_{UAV}$ of UAV 14, an airspeed of UAV 14, a number of satellites in communication with UAV 14, or a compass heading of UAV 14.

In some examples, PC 42 may be further configured to output for display on HMD 16 an alert, such as responsive to determining, and indicative of one or more of a low UAV battery, a GPS-signal lost, an obstacle-proximity warning, a UAV mission milestone reached.

In some examples, transceiver 44 and PC 42 may be configured to receive, from UAV camera 116, video data, and output for display on HMD 16 the video data. For example, display screen 38 of HMD 16 may include a "picture in picture" type window featuring a live feed of recorded video data from camera 116 of UAV 14.

In some examples, transceiver 44 and PC 42 may be configured to receive a planned flightpath of UAV 14 and output for display on HMD 16 an indication of the flightpath, such as with respect to the current position or location of UAV 14.

In some examples, PC 42 may be further configured to determine a loss of line-of-sight between HMD 16 and UAV 14 and output for display on HMD 16 an indication of the loss of line-of-sight.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media 43, 61, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media 43, 61 can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors 42, 60, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Cloud technology used to automatically save the images on web server is not limited to local or global internet cloud. It can be a private and/or public cloud which is protected by the user ID and passwords. The passwords may not limit to one or two.

Various examples have been described. These and other examples are within the scope of the following claims.

What is claimed is:

1. A device comprising:
an augmented-reality (AR) head-mounted display (HMD); and
processing circuitry configured to:
receive a planned flightpath of an unmanned aerial vehicle (UAV);
determine a location of the UAV;
determine based on the location of the UAV and the planned flightpath of the UAV a first graphical object indicating the planned flightpath of the UAV;
output for display on the AR HMD the first graphical object indicating the planned flightpath of the UAV;
determine a location of an obstacle within the field of view of the AR HMD presenting a loss of line-of-sight between the AR HMD and the UAV along the planned flightpath; and
output, for display on the AR HMD, a second graphical object indicating the location of the obstacle.

2. The device of claim 1, wherein the processing circuitry is further configured to:
determine a position and an orientation of the AR HMD;
based on the location of the UAV and the position and the orientation of the AR HMD, determine that the UAV is outside of a field of view of the AR HMD;
in response to determining that the UAV is outside of the field of view of the AR HMD, present, on the AR HMD, a third graphical object indicating a movement to bring the UAV within the field of view of the AR HMD;
based on the location of the UAV and the position and orientation of the AR HMD, determine that the UAV is within the field of view of the AR HMD; and
in response to determining that the UAV is within the field of view of the AR HMD, present, on the AR HMD, a fourth graphical object indicating the location of the UAV.

3. The device of claim 2, wherein the fourth graphical object indicating the location of the UAV comprises a bounding box around the UAV.

4. The device of claim 1, wherein the processing circuitry is configured to determine the location of the obstacle by processing image data from a camera.

5. The device of claim 4, wherein the camera is located on the AR HMD.

6. The device of claim 1, wherein the obstacle comprises:
a bird;
a manned aircraft;
a second UAV; or
terrain.

7. The device of claim 1, wherein the second graphical object indicating the location of the obstacle comprises a bounding box around the location of the obstacle.

8. The device of claim 2, the processing circuitry further configured to:
determine, based on the position and orientation of the AR HMD, a location of a controlled airspace relative to the field of view of the AR HMD; and
present, on the AR HMD, a fifth graphical object indicating boundaries of the location of the controlled airspace relative to the field of view of the AR HMD.

9. The device of claim 2, the processing circuitry further configured to determine a field of view of a camera of the UAV; and
output for display on the AR HMD a fifth graphical object indicating a boundary of the field of view of the camera relative to the field of view of the AR HMD.

10. The device of claim 1, the processing circuitry further configured to output for display on the AR HMD a third graphical object indicating:
a remaining battery life of the UAV;
an altitude of the UAV;
an airspeed of the UAV;
a number of satellites in communication with the UAV; or
a compass heading of the UAV.

11. The device of claim 1, the processing circuitry further configured to output for display on the AR HMD a graphical alert indicating:
a low UAV battery;
a GPS-signal lost;
an obstacle-proximity warning; or
a UAV mission milestone reached.

12. The device of claim 1, the processing circuitry further configured to:
receive, from the UAV, video data; and
output for display on the AR HMD the video data.

13. The device of claim 1, wherein the AR HMD comprises an opaque display screen, the AR HMD configured to display imagery on the display screen.

14. The device of claim 1, wherein the AR HMD comprises a see-through holographic lens, the AR HMD configured to display one or more virtual elements on the lens.

15. A method comprising:
receiving a planned flightpath of an unmanned aerial vehicle (UAV);
determining a location of the UAV; and
determining, based on the location of the UAV and the planned flightpath of the UAV, a first graphical object indicating the planned flightpath of the UAV;
outputting, for display on an augmented-reality (AR) head-mounted display (HMD), the first graphical object indicating the planned flightpath of the UAV;
determining a location of an obstacle within a field of view of the AR HMD presenting a loss of line-of-sight between the AR HMD and the UAV along the planned flightpath; and
outputting, for display on the AR HMD, a second graphical object indicating the location of the obstacle.

16. The method of claim 15, further comprising:
determining a position and an orientation of the AR HMD;
based on the location of the UAV and the position and the orientation of the AR HMD, determining that the UAV is within the field of view of the AR HMD; and
in response to determining that the UAV is within the field of view of the AR HMD, presenting, on the AR HMD, a third graphical object indicating the location of the UAV.

17. The method of claim 15, further comprising:
determining a position and an orientation of the AR HMD;
based on the location of the UAV and the position and the orientation of the AR HMD, determining that the UAV is outside the field of view of the AR HMD; and
in response to determining that the UAV is outside the field of view of the AR HMD, presenting, on the AR HMD, a third graphical object indicating a movement to bring the UAV within the field of view of the AR HMD.

* * * * *